US006729833B2

(12) United States Patent
Cichon et al.

(10) Patent No.: US 6,729,833 B2
(45) Date of Patent: May 4, 2004

(54) METHOD AND APPARATUS FOR EXTRACTING AND INSTALLING HEAT EXCHANGER BUNDLES

(75) Inventors: David E. Cichon, O-Fallen, MO (US); Jeffrey L. Wilson, Winfield, MO (US); Michael J. Uremovich, Manhattan, IL (US)

(73) Assignee: Starcon International, Inc., Manhattan, IL (US)

( * ) Notice: Subject to any disclaimer, the term of this patent is extended or adjusted under 35 U.S.C. 154(b) by 0 days.

(21) Appl. No.: 09/866,276

(22) Filed: May 25, 2001

(65) Prior Publication Data

US 2002/0037214 A1 Mar. 28, 2002

Related U.S. Application Data

(63) Continuation-in-part of application No. 09/851,354, filed on May 8, 2001, now Pat. No. 6,684,423.
(60) Provisional application No. 60/235,131, filed on Sep. 25, 2000.

(51) Int. Cl.⁷ .............................................. B65G 67/12
(52) U.S. Cl. .................... 414/745.3; 414/495; 414/497; 414/498; 414/541
(58) Field of Search .............................. 414/745.3, 458, 414/495, 497, 498, 541, 800, 809, 812, 814; 180/11, 189.12, 9.1; 280/124.109, 781, 785; 296/190.07

(56) References Cited

U.S. PATENT DOCUMENTS 2,890,043 A    6/1959  Bruns
3,048,280 A    8/1962  Huff et al.
3,112,830 A  * 12/1963  Podlesak .................... 294/106

(List continued on next page.)

FOREIGN PATENT DOCUMENTS

GB        2000715 A        1/1979
JP        406072560 A  *   3/1994
WO        WO 89/03795 A1   5/1989

OTHER PUBLICATIONS

Brochure for Acme 30 Ton Open End Hoist by Acme Hoist Incorporated.
Brochure for Acme 35 Ton Open End Hoist by Acme Hoist Incorporated.
Brochure for Hull Lev/Ler Control by Acme Hoist Incorporated.
Brochure Acme Boat Hoists by Acme Hoist Incorporated.
Hydro–Extractors, Inc. general product description of, and sketch of, a tube bundle extractor.
Brochure, "The Bundle Wagon" M&H Manufacturing Corporation.

(List continued on next page.)

Primary Examiner—Janice L. Krizek
(74) Attorney, Agent, or Firm—Fulbright & Jaworski, LLP

(57) ABSTRACT

An apparatus and a method to remove and install horizontal heat exchanger bundles. A continuous track and a main frame having a carriage frame with vertical hydraulic cylinders are used and achieve the stability necessary to support and level a heat exchanger bundle during removal from its shell at various vertical heights. The preferred configuration allows the main frame, hydraulic cylinders, pads and tracks which provide a large surface area on the ground, to remain on the ground as the hydraulic cylinders raise the carriage frame to the height of the bundle shell to increase stability of the apparatus. Moreover, the tracks allow the self-propelled extractor to move over gravel, asphalt, and/or soft uneven surfaces without becoming embedded into the surface. Alternatively, the carriage frame may be raised or moved using a crane or helicopter by removing the carriage frame from the main frame.

17 Claims, 2 Drawing Sheets

U.S. PATENT DOCUMENTS

| | | | |
|---|---|---|---|
| 3,180,498 A | | 4/1965 | Postlewaite |
| 3,239,076 A | * | 3/1966 | Huff .......................... 254/29 R |
| 3,239,077 A | | 3/1966 | Huff et al. |
| 3,257,001 A | * | 6/1966 | Postlewaite et al. ........ 254/100 |
| 3,335,879 A | | 8/1967 | Shaffer |
| 3,403,728 A | | 10/1968 | Richardson et al. |
| 3,445,019 A | | 5/1969 | Steinert |
| 3,515,300 A | | 6/1970 | Hollenbach |
| 3,567,044 A | | 3/1971 | Travis |
| 3,602,385 A | | 8/1971 | Wilson |
| 3,608,761 A | | 9/1971 | Taylor |
| 3,655,081 A | | 4/1972 | Monk |
| 3,658,191 A | * | 4/1972 | Murphy ...................... 212/167 |
| 3,688,931 A | | 9/1972 | Tax et al. |
| 3,703,243 A | | 11/1972 | Monk |
| 3,712,404 A | | 1/1973 | Walquist |
| 3,747,789 A | | 7/1973 | Shipley et al. |
| 3,765,544 A | | 10/1973 | Murphy |
| 3,786,948 A | | 1/1974 | Golden |
| 3,789,929 A | | 2/1974 | Leidig |
| 3,792,779 A | | 2/1974 | Brazell |
| 3,814,203 A | | 6/1974 | Gieszl |
| 3,834,566 A | | 9/1974 | Hilfker |
| 3,836,015 A | | 9/1974 | Travis |
| 3,836,025 A | | 9/1974 | Olson et al. |
| 3,840,128 A | | 10/1974 | Swoboda, Jr. et al. |
| 3,908,845 A | | 9/1975 | Bolt |
| 3,935,951 A | | 2/1976 | Claus et al. |
| 3,937,340 A | | 2/1976 | Grove |
| 3,958,698 A | | 5/1976 | van der Woerd |
| 3,963,130 A | | 6/1976 | Maynard |
| 4,022,428 A | | 5/1977 | Mantha |
| 4,053,062 A | * | 10/1977 | Travis ........................... 214/1 |
| 4,095,335 A | | 6/1978 | Lassarat |
| 4,102,463 A | | 7/1978 | Schmidt |
| 4,184,425 A | | 1/1980 | Haney et al. |
| 4,194,756 A | | 3/1980 | van der Lely |
| 4,199,299 A | | 4/1980 | Petitto, Sr. et al. |
| 4,227,854 A | * | 10/1980 | Coffey ......................... 254/111 |
| 4,269,427 A | | 5/1981 | van der Lely |
| 4,274,796 A | | 6/1981 | Phillips |
| 4,312,124 A | | 1/1982 | Calhoun |
| 4,323,398 A | * | 4/1982 | Simon .......................... 134/18 |
| 4,352,406 A | | 10/1982 | Fahrenschon |
| 4,358,242 A | | 11/1982 | Davies |
| 4,392,524 A | | 7/1983 | Bauch |
| 4,444,287 A | | 4/1984 | Voelz |
| 4,480,942 A | | 11/1984 | Farrow |
| 4,549,610 A | | 10/1985 | van der Lely |
| 4,575,305 A | * | 3/1986 | Krajicek et al. ........... 29/726.5 |
| 4,652,195 A | | 3/1987 | McArthur |
| 4,666,365 A | * | 5/1987 | Cradeur ...................... 414/501 |
| 4,676,713 A | | 6/1987 | Voelpel |
| 4,718,805 A | | 1/1988 | Becker |
| 4,763,800 A | * | 8/1988 | Engler et al. ............... 212/195 |
| 4,834,604 A | | 5/1989 | Brittain et al. |
| 4,838,438 A | | 6/1989 | Ishige et al. |
| 4,856,545 A | | 8/1989 | Krajicek et al. |
| 4,869,638 A | | 9/1989 | Krajicek et al. |
| 4,877,365 A | | 10/1989 | Lanigan Jr. et al. |
| 4,960,359 A | | 10/1990 | Lovitt, Jr. |
| 5,032,054 A | | 7/1991 | Krajicek et al. |
| 5,114,295 A | | 5/1992 | Jansson |
| 5,169,281 A | | 12/1992 | Boisture |
| 5,203,072 A | | 4/1993 | Boisture |
| 5,322,410 A | | 6/1994 | Persinger et al. |
| 5,323,529 A | | 6/1994 | Amuny |
| 5,383,271 A | | 1/1995 | Amuny |
| 5,403,145 A | | 4/1995 | Cradeur et al. |
| 5,425,814 A | | 6/1995 | Krajicek et al. |
| 5,562,400 A | | 10/1996 | Travis |
| 5,564,179 A | | 10/1996 | Amuny |

OTHER PUBLICATIONS

Brochure, American Mechanical Services, Inc. Model Sp–A101.

Brochure, Serv–Tech, Inc., Fast Draw Bundle Extractor.

Brochure, Peinemann Equipment, Hydraulic Tube Bundle Extractor.

Brochure, Hammelmann Refinery Service System, Extractor Tool.

Bundle Wagon Parts and Instruction Manual, M & H Manufacturing Corporation.

* cited by examiner

METHOD AND APPARATUS FOR EXTRACTING AND INSTALLING HEAT EXCHANGER BUNDLES

This application is a Continuation-In-Part of U.S. patent application Ser. No. 09/851,354 filed on May 8, 2001, now U.S. Pat. No. 6,684,423, which claims the benefit of U.S. Provisional Application Ser. No.: 60/235,131 filed on Sep. 25, 2000.

BACKGROUND OF THE INVENTION

The present invention relates to a lifting and moving device. More particularly, the present invention relates to an apparatus and a method for removing and installing horizontally disposed heat exchanger bundles.

Heat exchangers are used in chemical processing plants, such as petroleum refineries and distilling facilities for absorbing heat created by high temperature reactions. These heat exchangers utilize long metal tubes arranged in a cylindrical bundle. The bundle is generally heavy and may vary in diameter and length. For example, often these bundles may average one to six feet in diameter, twelve to twenty-four feet long and may have a weight of two to forty tons. Further, the preceding diameter, length, and weight may be exceeded.

An individual bundle is typically inserted into a horizontally disposed shell and coupled to an inlet and an outlet in the heat exchanger system which typically has multiple bundles. To facilitate heat exchange, fluid enters into a bundle from its inlet in the heat exchanger thereby flowing through the individual tubes of the bundle and exits via the outlet. Heat exchanger fluid flows through the shell, past the outside of the tubes and the tube and shell fluids may travel through a series of horizontally stacked bundles before being collected for reuse or recycling. During use, the individual tubes of the bundle are subject to fouling and corrosion and also have a limited life. Thus, each bundle in the heat exchanger requires regular maintenance of the individual tubes of the bundle and eventual replacement thereof.

The physical size and weight of the bundles create significant obstacles for maintenance and replacement. For maintenance, the bundle must be removed from its shell by a bundle extractor and often transported to another on-site location or an off-site facility more suited to the work required. A large heat exchanger may have multiple bundles arranged in stacks, one above the other. Thus, the lowest bundle may be contained in a shell a few feet off of the ground while the highest may be over thirty feet above the ground.

Another obstacle is the need to support and balance the bundle as the bundle is pulled from its shell. This problem is compounded by the fact that these bundles vary in length. Thus, a method and apparatus are needed for removing these heat exchanger bundles at a wide variety of heights from ground level while keeping the bundles securely supported as they are pulled from their shells.

A heat exchanger bundle is typically removed from its shell by a pulling car or sled of the extractor that exerts a pulling force on a tube sheet which is fixed to the ends of the tube bundle. Significant force is often required to break the bundle free from its shell due to normal product corrosion between the bundle and tube sheet and the shell. A pulling mechanism such as a winch, hydraulic jack, or screw drive and motors are typically used with the extractor pulling sled to break the bundle free. Once free, the bundle is positioned on a sliding carriage mounted on a frame of the extractor such that the bundle carriage is moved along the frame as the bundle is pulled from its shell. Due to the weight and length of the bundle, the carriage and frame may be tilted to balance the bundle as the bundle is removed.

Different types of equipment have been used to support the carriage and frame of the extractors in their operative position for pulling of heat exchanger tubes bundles. U.S. Pat. Nos. 3,836,015 and 4,053,062 to Travis and U.S. Pat. Nos. 4,869,638 and 5,032,054 to Krajicek et al. disclose an aerial supported carriage and frame for being lifted by a crane and which may be moved off site using the crane or a helicopter. Another approach is mounting the frame to a telescoping column on a truck bed as disclosed in U.S. Pat. No. 4,575,305 to Krajicek et al. and U.S. Pat. No. 5,403,145 to Cradeur et al. Another extractor disclosed in U.S. Pat. No. 5,383,271 to Amuny uses four telescoping cylinders to support and lift the frame. U.S. Pat. No. 5,562,400 to Travis and U.S. Pat. No. 5,564,179 to Amuny disclose extractors that utilize wheels and drive means to provide a self-propelled bundle extractor and have outrigger lifting columns which raise the frame to the height of the bundle shell.

Extractors which require the use of cranes to position the frame at the shell of the heat exchanger bundle are not practical for use in areas with limited clearance between the heat exchanger unit and other structures. Similarly, extractors mounted on truck beds present the same space concerns. In these limited clearance areas, there may not be adequate space to position a crane or truck between the structures. Thus, a mobile extractor that is self-propelled and has a self-contained mechanism for raising and lowering its extractor frame is usually preferred due to the limited clearances between structures.

U.S. Pat. Nos. 5,562,400 and 5,564,179 disclose self-propelled extractors a support frame and carriage that are mounted on wheels with hydraulic cylinders or telescoping lifting columns. The extractor of the latter patent utilizes the lifting columns to raise both the support frame and carriage to the vertical position of the heat exchanger shell; whereas, U.S. Pat. No. 5,562,400 uses the lifting columns to raise only a carriage frame having a pulling sled and skids. Due to the extreme weight of the heat exchanger bundle, which can exceed forty tons, the use of rubber wheels is not practical because they cannot support the weight. Therefore, steel wheels with polyurethane shells are used.

One problem with self-propelled extractors of this type is that the heat exchanger units are typically located outside on asphalt or gravel surfaces which may become soft due to rain or sun exposure such that the steel wheels often dig into the surface as the extractor is moved across the surface or when turning. After the bundle is pulled onto the extractor, the added weight often embeds the wheels into the surface making it impossible for the extractor to move under its own power. As an alternative, a self-propelled extractor may provide for lifting the extractor with a crane such as that disclosed in U.S. Pat. No. 5,564,179. Due to the weight of the extractor and bundle, which may be over sixty-five tons, a large crane is required. Under some union rules, the operation of a large crane requires two workers, an operator and an oiler. However, for the operation of smaller cranes, only one worker is required, the operator. To support two shifts of extractor operations, the added oiler increases the labor costs approximately $6,000 to $8,000 per shift per week.

Another problem with known extractors is that the telescoping columns which lift the support frame and carriage of the extractor to the height of the shell become very unstable when the support frame is near or at the top of its vertical travel due to the progressive upwardly shifting of the extractor's center of gravity. The four telescoping columns usually have to support the entire weight of the support frame carriage and eventually the bundle, e.g. see U.S. Pat. No. 5,564,179. Furthermore, as the bundle is being pulled onto the carriage, the added weight of the bundle to the front of the extractor adjacent the shell shifts the center of mass of the extractor, rendering it unstable. Likewise, as the bundle is being pulled from the shell and onto the carriage, the changing position of its center of mass may tilt the extractor frame such that one of the front or the rear columns may support more weight than the others, which may cause the extractor to tilt or rock. Thus, added precautions must be taken to prevent or compensate for the sudden shifts in weight to prevent the extractor from overturning.

Accordingly, a method and apparatus are needed that provide a heat exchanger bundle extractor apparatus that remains stable when removing or installing heat exchanger bundles at high levels above ground surface. Further, a method and apparatus which can fit into tight spaces for accessing bundles, while still having stability during a pulling operation with the ability to transport a pulled bundle to another location thereafter, is needed.

SUMMARY OF THE INVENTION

In accordance with the present invention, a continuous track having a predetermined surface area and main frame having a carriage frame with four vertical hydraulic cylinders may be used and may achieve the stability necessary to support and level a heat exchanger bundle during removal from its shell at various vertical heights and to move the extractor, with or without a bundle, across gravel, asphalt and uneven surfaces. Preferably, two continuous tracks having flat plates, such as, for example, polystyrene plates passing around multiple wheels attached to a mainframe may be used to support and provide movement to the extractor. An engine, preferably an air cooled diesel engine, may be used to rotate the tracks and may allow the extractor to be driven to and from the in-use location of the heat exchanger bundles. The tracks may provide a large predetermined and substantially constant surface area to spread the load of the extractor and the bundle on the ground. Accordingly, the large constant surface area may prevent the track from becoming embedded into the ground as the track rolls and the track may overcome the limitations of steel wheels. Further, the track may allow the extractor to traverse uneven, soft, or rough ground which may be difficult for steel-wheeled extractors to traverse.

Preferably, the lower portions of four hydraulic cylinders may be vertically mounted at the corners of a rectangular main frame of the extractor. The base of each cylinder may have a pad of at least seventy-five inches for engaging the ground and may have a spherical joint. When the extractor is stationary for removing a bundle, each pad may be positioned using the knuckle joint to match the grade of the ground to balance and support the extractor which may increase stability in its stationary position.

The upper portion of the hydraulic cylinders may be attached to a carriage frame and a piston may be attached via a siamese cylinder mounted to the main frame. (The term "siamese" is defined as the connection of two or more pipes so as to permit discharge in a single stream.) Actuating the piston may raise and lower the carriage frame with respect to the main frame. Accordingly, each cylinder may be independently controlled to tilt and level the carriage frame to compensate for a grade in the surface and the changing center of gravity of the extractor during removal of the bundle from its shell and during the raising and lowering of the carriage frame.

Alternatively, the extractor may be raised or moved using a crane or helicopter by removing the carriage frame from the main frame at disconnects located at the hydraulic cylinders and the main frame. Cylindrical horizontal shafts may be provided at each corner of the carriage frame for attaching slings to lift the carriage frame and bundle. Disconnecting the carriage frame from the main frame provides a lightweight, aerial extractor by eliminating the main frame, track, drive motor, and/or hydraulic cylinders.

The preferred configuration allows the main frame, hydraulic cylinders, pads and/or tracks which provide a large surface area on the ground, to remain on the ground as the hydraulic cylinders raise the carriage frame to the height of the bundle shell. Thus, the present invention increases the surface area for supporting the load of the extractor over previously available extractors. Further, the stationary rectangular main frame which remains near the ground when the carriage frame is raised and the large surface area of the tracks increase stability. Moreover, the tracks may overcome the obstacles presented by steel wheels, thereby allowing the self-propelled extractor to move over gravel, asphalt, and/or soft and uneven surfaces without becoming embedded into the surface.

To this end, in an embodiment of the present invention, an apparatus is provided for removing a heat exchanger bundle. The apparatus has a frame, a propelling mechanism on the frame, a vertically shiftable portion of the frame, and a track associated with the propelling mechanism. A flat portion is in engagement with a predetermined area of the ground.

In an embodiment, lifting members are provided having feet wherein the plurality of lifting members raise the frame.

In an embodiment, power cylinders having feet are provided wherein the power cylinders raise the frame.

In an embodiment, a pulling member is associated with the frame wherein the pulling member attaches to the heat exchanger bundle.

In an embodiment, the track is an articulated track having segmented portions.

In an embodiment, the flat portion of the track extends lengthwise.

In an embodiment, a base frame and an upper frame are provided wherein the base frame is larger than the upper frame and the base frame remains fixed as the upper frame vertically shifts.

In an embodiment, a base frame portion and a smaller frame portion of the frame is provided wherein the smaller frame portion is detachable from the frame such that the heat exchanger bundle and the smaller frame portion may be lifted from the base frame portion.

In an embodiment, a connection is provided between the base frame portion and the smaller frame portion.

In an embodiment, the frame has a length substantially aligned with that of the heat exchanger bundle.

In an embodiment, a track is provided on either side of the frame.

In another embodiment of the present invention, a method is provided for supporting a load to be removed from an in-use location. The method comprises the steps of: providing an apparatus for removing the heavy load; providing a propelling mechanism on the apparatus; providing a track associated with the propelling mechanism where the track has a flat portion in engagement with a predetermined area of the ground; aligning a vertically shiftable frame portion of the apparatus with the load; removing the load from the in-use location; shifting the load onto the frame portion; spreading the load over a predetermined area on a support surface adjacent to the in-use location; and stabilizing the apparatus as the load is shifted.

In an embodiment, spreading of the load is provided by at least one substantially flat load spreading surface portion in engagement with the support surface over the predetermined area on the support surface.

In an embodiment, integrating the propelling mechanism is provided with the apparatus such that the apparatus is self-propelled.

In an embodiment, maneuvering the apparatus onto the support surface is provided.

In an embodiment, rolling a continuous propelling surface of the propelling mechanism of the apparatus is provided.

In an embodiment, a method is further provided for including the flat load spreading surface portion along the support surface.

In an embodiment, maintaining substantially the same predetermined area of engagement between the load spreading surface portion of the propelling surface and support surface to propel the apparatus to a remote location from the in-use location is provided.

In an embodiment, sizing the flat load spreading surface portion so that the predetermined area of engagement with the support surface attempts to avoid deforming the support surface with the load carried on the apparatus is provided.

In an embodiment, propelling the apparatus carrying the load to a remote location from the in-use location while minimizing deformation of the support surface during transport is provided.

In an embodiment, a first frame portion and a second frame portion of the apparatus is provided wherein the first frame portion is aligned with the load to be removed and wherein the first frame portion has connections associated with the second frame portion.

In an embodiment, connecting a lifting device to the connections on the first frame portion is provided.

In an embodiment, disconnecting the first frame portion from the second frame portion is provided.

In an embodiment, lifting the first frame portion and the load is provided.

In an embodiment, the load is one of a plurality of heat exchanger bundles that are at various levels of elevation relative to the support surface.

In an embodiment, pulling the load and progressively shifting the load onto the frame portion is provided.

In another embodiment of the present invention, a method is provided for supporting and moving a heat exchanger bundle over a transport surface. The method comprises the steps of: providing a mobile extractor apparatus having a carriage frame and a main frame; providing a propelling mechanism for moving the apparatus along the transport surface; raising the carriage frame relative to the main frame to the height of the heat exchanger bundle wherein the main frame remains near the transport surface; pulling the heat exchanger bundle onto the carriage frame; lowering the carriage frame and the heat exchanger bundle toward the transport surface; rotating an engaging surface of the propelling mechanism in contact with the transport surface; transporting the heat exchanger bundle; and supporting the heat exchanger bundle with the apparatus, the carriage frame, and the main frame while maintaining a surface area of engagement between the engaging surface and the transport surface.

In another embodiment of the present invention, the method actuates hydraulic cylinders of the mobile extractor apparatus to raise the carriage frame.

In another embodiment of the present invention, a method is provided for supporting and moving a heat exchanger bundle. The method comprises the steps of: providing a mobile extractor apparatus having a carriage frame, a main frame, and a propelling mechanism; moving the mobile extractor apparatus along the transport surface with the propelling mechanism; raising the carriage frame relative to the main frame; lifting the carriage frame from the main frame to the height of the heat exchanger bundle while the main frame remains near the transport surface; pulling the heat exchanger bundle onto the carriage frame; lowering the carriage frame and the heat exchanger bundle toward the transport surface; connecting a lifting device to the carriage frame; disconnecting the carriage frame from the main frame; and lifting the carriage frame and the heavy heat exchanger bundle supported by the carriage frame while the main frame and propelling mechanism remain in contact with the engaging surface.

In an embodiment, the method actuates hydraulic cylinders of the mobile extractor apparatus to life the carriage frame.

In another embodiment of the present invention, an apparatus is provided for removing a heat exchanger bundle. The apparatus has a frame, a propelling mechanism on the frame, a vertically shiftable portion of the frame, and power cylinders wherein the power cylinders raise the vertically shiftable portion of the frame.

In an embodiment, a plurality of lifting members are provided wherein the plurality of lifting members raise the frame.

In an embodiment, feet are associated with the power cylinders.

In an embodiment, a pulling member is associated with the frame wherein the pulling member attaches to the heat exchanger bundle.

In an embodiment, a base frame portion of the frame and a smaller frame portion of the frame are provided wherein the smaller frame portion is detachable from the frame such that the heat exchanger bundle and the smaller frame portion may be lifted from the base frame portion.

In an embodiment, a connection is provided between the base frame portion and the smaller frame portion.

In an embodiment, the frame has a length substantially aligned with that of the heat exchanger bundle.

In an embodiment, a track is provided on each side of the frame.

It is, therefore, an advantage of the present invention to provide an apparatus and a method for removing and installing horizontally disposed heat exchanger bundles.

Another advantage of the present invention is to provide an apparatus and a method having a track with plates associated with the apparatus such that the track may provide surface area to spread the load of the apparatus and heat exchanger bundles and attempt to prevent the track from becoming embedded into the ground.

Another advantage of the present invention is to provide an apparatus and a method having a track associated with the apparatus such that the apparatus may traverse uneven, soft, or rough ground.

Moreover, an advantage of the present invention is to provide an apparatus and a method having four hydraulic cylinders with pads vertically mounted at the corners of the apparatus such that the pads may be positioned to match the grade of the ground.

Yet another advantage of the present invention is provide an apparatus and a method having pistons attached to a carriage frame such that the piston may be actuated to raise and lower the carriage frame.

Another advantage of the present invention is to provide an apparatus and a method having cylinders that may be independently controlled to tilt and level the carriage frame to compensate for a grade in the surface and to compensate for the changing center of gravity of the apparatus.

Still further, an advantage of the present invention is to provide an apparatus and a method allowing the extractor to be raised or moved by a crane or helicopter.

Another advantage of the present invention is to provide an apparatus and a method having a heat exchanger bundle extractor apparatus that remains stable when removing or installing heat exchanger bundles at high levels above ground surface.

Another advantage of the present invention is to provide an apparatus and a method having a heat exchanger bundle extractor apparatus which can fit into tight spaces for accessing bundles.

Yet, another advantage of the present invention is to provide an apparatus and a method having a heat exchanger bundle apparatus that will have stability during a pulling operation.

Still further, another advantage of the present invention is to provide an apparatus and a method having a heat exchanger bundle apparatus that will have the ability to transport a pulled bundle to another location.

Additional features and advantages of the present invention are described in, and will be apparent from, the detailed description of the presently preferred embodiments and from the drawing.

DETAILED DESCRIPTION OF THE PRESENTLY PREFERRED EMBODIMENTS

Figure 1:
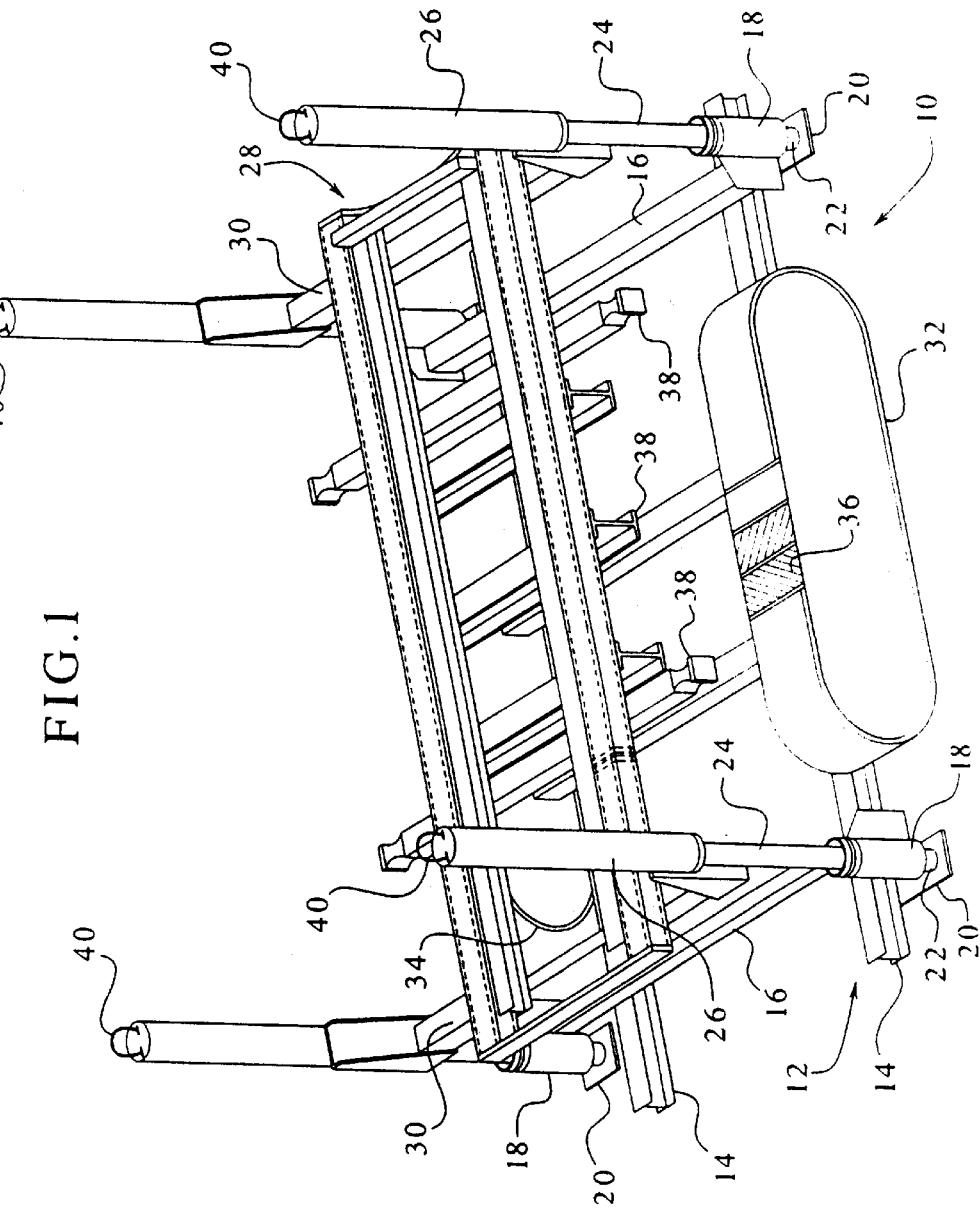
FIG. 1 illustrates a perspective view of an embodiment of the apparatus for extracting and installing heat exchanger bundles.

As shown in drawings for purposes of illustration, the invention is embodied in a heat exchanger tube bundle extractor apparatus 10. As shown in FIG. 1, the extractor apparatus 10 is embodied in a rectangular main frame 12 having a long pair of parallel members 14 and shorter parallel cross members 16. At each intersection of the long member 14 and the cross members 16 is a base cylinder 18 which may be attached thereto. Each base cylinder 18 may have a support pad 20 having approximately seventy-five square inches of surface area for engaging the ground. The support pad 20 may be attached to eight inner cylinders 22 which may be received by the base cylinder 18 such that the support pad may be lowered to the ground.

One form of the extractor apparatus 10 may utilize a spherical joint (not shown) so that the angle in which support pad 20 may engage the ground may be adjusted to accommodate the grade of the ground at a location of each of the support pads 20. Thus, each of the support pads 20 and the inner cylinder 22 may have a spherical joint so that each of the support pads 20 may be independently adjusted to increase stability of the extractor apparatus 10 when in a stationary position.

The base cylinder 18 may also receive a piston 24 from a hydraulic cylinder 26. The upper portion of the hydraulic cylinder 26 may be attached to a carriage frame 28. The carriage frame 28 may also be rectangular; however, it is smaller than the main frame 12. The carriage frame 28 may have two shorter cross members 30 at each end which may be detachably mounted to the hydraulic cylinders 26 by disconnects (not shown). When the piston 24 of the hydraulic cylinder 26 is actuated, the carriage frame 28 may be raised above main frame 12. Each of the hydraulic cylinders 26 may be independently actuated to raise and tilt the carriage frame 28 to compensate for any grade in the support surface and the changing center of gravity due to the weight of the heat exchanger bundle (not shown) as the heat exchanger bundle is pulled onto the carriage frame 28 as described herein. Independent actuation of the hydraulic cylinders 26 may eliminate the need for leveling devices on the carriage frame 28, thereby reducing weight and minimizing the number of moving parts requiring maintenance.

When the hydraulic cylinders 26 are actuated, the pistons 24 may be driven downward which in turn may raise the carriage frame 28 above main frame 12 which may remain stationary. With the main frame 12 position close to the ground, the extractor apparatus 10 may maintain stable as the carriage frame 28 rises. In its lowest position above the main frame 12, the carriage frame 28 may be used to remove heat exchanger bundles as low as forty-three inches off of the ground. When the hydraulic cylinders 26 are actuated to the their full length of the pistons 24, the carriage frame 28 may be approximately fifteen feet above the ground.

Mounted to each parallel long member 14 of the main frame 12 may be tracks 32 and 34. The tracks 32 and 34 have plates 36 which may be made from polystyrene and may have a large smooth surface for engaging the ground. The smooth surface of the plates 36 as compared to those having ridges or tread, may maximize the surface area of the plate for supporting the weight of the extractor apparatus 10 and heat exchanger bundle (not shown).

Alternatively, the smooth surface of the plates 36 may be replaced with a surface having tread for use on slippery terrain such as mud or loose gravel. The plates 36 may be approximately fourteen inches in width and may be positioned one after the other with a space between each of the plates 36. The plates 36 may be joined by fastening devices to compose the continuous eight foot tracks 32 and 34.

The tracks 32 and 34 may be supported by a frame (not shown) with a drive member (not shown) to rotate the tracks 32 and 34 about the frame which, in turn, provides translation of the extractor apparatus 10. The tracks 32 and 34 and frame configuration may provide a predetermined, large area of approximately sixteen square feet in contact with the ground at all times. An engine (not shown) may provide the power to rotate the tracks 32 and 34 about the frame. As known in the art of track driven equipment, the tracks 32 and 34 are independently driven such that the extractor apparatus 10 may be turned by holding one track stationary while rotating the opposite track, which causes the extractor apparatus 10 to rotate in the direction of the track being held.

On the carriage frame 28 may be a series of sliding cross members 38 which may allow for adjusting the width of carriage frame 28 to accommodate the heat extractor bundles of varying width. The width of the carriage frame 28 may be adjusted for a particular diameter of the heat extractor bundle before or after transporting the heat exchanger bundle and the extractor apparatus 10 to the shell.

The extractor apparatus 10 may be transported to the work location by an engine that may provide power to the tracks 32 and 34. The support pads 20 may be lowered to the ground by extending the inner cylinder 22 downwards from the base cylinder 18 such that the support pad 20 is firmly planted on the ground. The support pads 20 may have a diameter of approximately seventy-five square inches and may be twice as great as that of the inner cylinder 22.

Each of the base cylinders 18 may have independent movement to accommodate uneven surfaces. After the support pads 20 are firmly planted, the hydraulic cylinders 26 may be used to raise the carriage frame 28 to the height of the shell where the heat exchanger bundle is located. The carriage frame 28 may rise as the piston 24 of each of the hydraulic cylinders 26 is actuated. The system of the hydraulic cylinders 26 and the pistons 24 may allow the main frame 12 to remain low to the ground to provide stability and a low center of gravity. Furthermore, each of the hydraulic cylinders 26 may be independently actuated to compensate for uneven surfaces by leveling the carriage frame 28.

After the carriage frame 28 is at the proper height location at the shell, the width of the carriage frame 28 may be adjusted using the sliding cross members 38 to accommodate the diameter of the heat exchanger bundle. A sled (not shown) that is mounted to carriage frame 28 may be used to attach the heat exchanger bundle to the extractor apparatus 10. A chain or wire cable may be used to secure the heat exchanger to the sled (not shown). The sled may also utilize a small motor (not shown) on the main frame 12 to move the sled that in turn may pull the attached heat exchanger bundle on to the carriage frame 28. As the weight of the heat exchanger bundle shifts on the carriage frame 28, the hydraulic cylinders 26 may be adjusted to keep the heat exchanger bundle level or parallel with the ground and to keep the apparatus stable and prevent tipping of the apparatus.

When the heat exchanger bundle is completely removed from the shell, the extractor apparatus 10 may be used to transport the heat exchanger bundle to a remote location for further inspection and maintenance work. The tracks 32 and 34 may be used to move the extractor apparatus 10 with the heat exchanger tube bundle carried on the carriage frame 28. This method of movement may be used to transport the heat exchanger tube bundle to the remote location, or in the alternative, the carriage frame 28 may be removed from the main frame 12 at the base cylinders 18 or alternatively at the hydraulic cylinders 26. Cables or chains (not shown) may be attached to hooks 40 to provide a means for lifting the carriage frame 28 and the heat exchanger bundle from the main frame 12 and thereby leaving the tracks 32 and 34 on the ground along with the engine. This provides a lighter weight system that may be aerially removed using a crane or helicopter. Furthermore, the carriage frame 28 and heat exchanger bundle may be aerially removed and loaded on a flatbed truck or railcar for transportation offsite.

Figure 2:
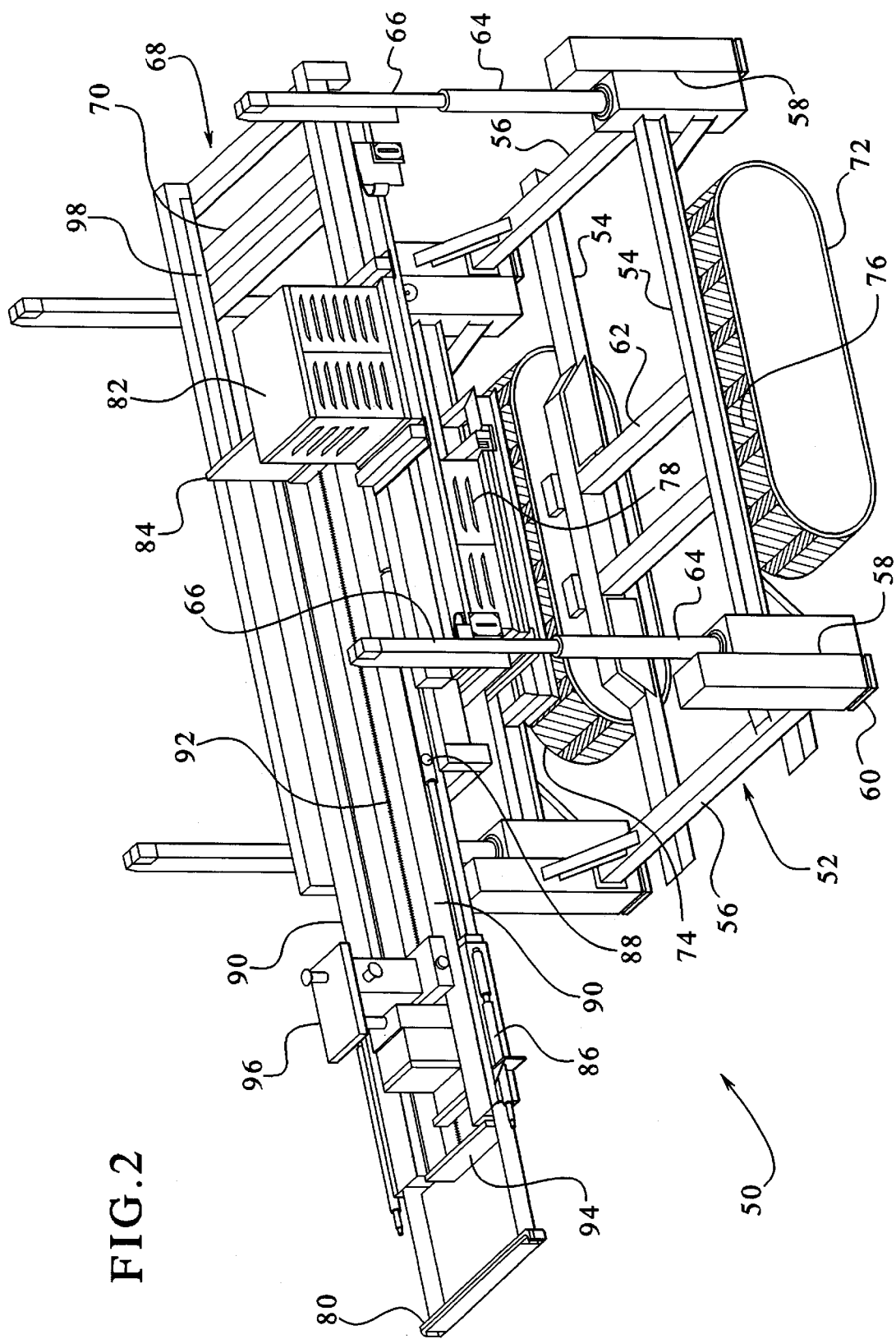
FIG. 2 illustrates a perspective view of another embodiment of the apparatus for extracting and installing heat exchanger bundles.

Referring now to FIG. 2, in another embodiment of the present invention, another extractor apparatus 50 is illustrated. As shown in FIG. 2, the extractor apparatus 50 is embodied in a rectangular main frame 52 having a long pair of parallel members 54 and shorter parallel cross members 56. At each intersection of the long member 54 and the cross members 56 is a siamese cylinder 58 which may be attached thereto. Each siamese cylinder 58 may have a support pad 60 having approximately seventy-five square inches of surface area for engaging the ground. The support pad 60 may be attached to eight inner cylinders (not shown) which may be received by the siamese cylinder 58 such that the support pad 60 may be lowered to the ground.

One form of the extractor apparatus 50 may utilize a spherical joint (not shown) so that the angle in which the support pad 60 may engage the ground may be adjusted to accommodate the grade of the ground at a location of each of the support pads 60. Thus, each of the support pads 60 and the inner cylinders (not shown) may have a spherical joint so that each of the support pads 60 may be independently adjusted to increase stability of the extractor apparatus 50 when in a stationary position.

The siamese cylinder 58 may also receive a piston 64 from a hydraulic cylinder 66. The upper portion of the hydraulic cylinder 66 may be attached to a carriage frame 68. The carriage frame 68 may also be rectangular. The carriage frame 68 may have two shorter cross members 70 at each end which may be detachably mounted to the hydraulic cylinders 66 by disconnects (not shown). When the piston 64 of the hydraulic cylinder 66 is actuated, the carriage frame 68 may be raised above main frame 52. Each of the hydraulic cylinders 66 may be independently actuated to raise and/or tilt the carriage frame 68 to compensate for any grade in the support surface and the changing center of gravity. The center of gravity may change due to the weight of the heat exchanger bundle (not shown) as the heat exchanger bundle is pulled onto the carriage frame 68 as described herein. Independent actuation of the hydraulic cylinders 66 may eliminate the need for leveling devices on the carriage frame 68, thereby reducing weight and/or minimizing the number of moving parts requiring maintenance.

When the hydraulic cylinders 66 are actuated, the pistons 64 may be driven downward which in turn may raise the carriage frame 68 above the main frame 52 which may remain stationary. With the position of the main frame 52 close to the ground, the extractor apparatus 50 may maintain stable as the carriage frame 68 rises. In the range from the lowest position and the highest position of the carriage frame 68 above the main frame 52, the carriage frame 68 may be used to remove heat exchanger bundles. The carriage frame 68 may be positioned as low as forty-three inches off of the ground. When the hydraulic cylinders 66 are actuated to the their full length of the pistons 64, the carriage frame 68 may be positioned approximately fifteen feet above the ground.

Mounted to each parallel long member 54 of the main frame 52 may be tracks 72 and 74. The tracks 72 and 74 have plates 76 which may be made from polystyrene and may have a large smooth surface for engaging the ground. The smooth surface of the plates 76 as compared to those having ridges or tread, may maximize the surface area of the plate for supporting the weight of the extractor apparatus 50 and heat exchanger bundle (not shown).

Alternatively, the smooth surface of the plates 76 may be replaced with a surface having tread for use on slippery terrain, such as mud or loose gravel. The plates 76 may be any length, however, preferably, the plates are approximately fourteen inches in width and may be positioned one after the other with a space between each of the plates 76. The plates 76 may be joined by fastening devices (not shown) to compose the continuous eight foot tracks 72 and 74.

The tracks 72 and 74 may be supported by a frame 62 with a drive member (not shown) to rotate the tracks 72 and 74 about the frame which, in turn, provides translation of the extractor apparatus 50. The tracks 72 and 74 and the configuration of the frame 62 may provide a predetermined, large area in contact with the ground at all times. Preferably, predetermined large area of the track may be approximately sixteen square feet. An engine 78 may provide the power to rotate the tracks 72 and 74 about the frame 62. As known in the art of track driven equipment, the tracks 72 and 74 may be independently driven such that the extractor apparatus 50 may be turned by holding one track stationary while rotating the opposite track, which causes the extractor apparatus 50 to rotate in the direction of the track being held.

On the carriage frame 68 may be a series of sliding cross members (not shown) which may allow for adjusting the width of carriage frame 68 to accommodate the heat extractor bundles of varying width. The width of the carriage frame 68 may be adjusted for a particular diameter of the heat extractor bundle before or after transporting the heat exchanger bundle and the extractor apparatus 50 to the shell.

The extractor apparatus 50 is transported to the work location by the engine 78 that may provide power to the tracks 72 and 74. After the extractor apparatus 50 is at the proper location, the support pads 60 may be lowered to the ground by extending the inner cylinders downwards from the siamese cylinder 58 such that the support pads 60 may be firmly planted on the ground. The support pads 60 may have a diameter of approximately seventy-five square inches and may be twice as great as that of the inner cylinders.

Each siamese cylinder 58 may have independent movement to accommodate uneven surfaces. After the support pads 60 are firmly planted, the hydraulic cylinders 66 may be used to raise the carriage frame 68 to the height of the shell where the heat exchanger bundle is located. The carriage frame 68 may rise as the piston 64 of each of the hydraulic cylinders 66 is actuated. The system of the hydraulic cylinders 66 and the pistons 64 may allow the main frame 52 to remain low to the ground to provide stability and a low center of gravity. Furthermore, each of the hydraulic cylinders 66 may be independently actuated to compensate for uneven surfaces by leveling the carriage frame 68.

After the carriage frame 68 is at the proper height location at the shell, the width of the carriage frame 68 may be adjusted, and a grabber 80 that may be mounted to carriage frame 68 may be used to attach the heat exchanger bundle (not shown) to the extractor apparatus 50. A chain or wire cable (not shown) may be used to secure the heat exchanger to the grabber 80 and to cylinders 86. A grabber cylinder 88 on each of beams 90 of the carriage frame 68 may move the grabber 80 a distance out relative to the carriage frame 68.

The carriage frame 68 may have a plate 84. A motor 82 on the carriage frame 68 may rotate a pump (not shown) that may power a hydraulic motor (not shown) which may power a hydraulic brake (not shown) that may power an actuator (not shown) that, in turn, may rotate a screw 92. The screw 92 may be attached at to the plate 84 at one end and to a trough 94 at another end. The trough 94 holds a sled 96. The sled 96 may be moved forward or back by the screw 92. The sled 96 moves within the trough 94. The trough 94 may be housed within the beams 90. Beam cylinders 98 may move the beams 90 forward and back relative to the carriage frame 68. Thus, the carriage frame 68 preferably has three sections that may move relative to the carriage frame: the grabber 80, the beams 90 and the sled 96. The grabber 80 and the beams 90 may extend the length of the carriage frame 68.

After the carriage frame 68 is in place, the chain or wire cable may be used to secure the heat exchanger to the grabber 80 and to cylinders 86. The grabber 80 may then be pulled back by the grabber cylinder 88 on each of the beams 90. The grabber 80 and the cylinders 86 may break the heat exchanger bundles out of their shell and pull the heat exchanger bundles onto the sled 96 of the carriage frame 68. The sled 96 and the beams 90 may retract to pull the heat exchanger bundle fully onto the carriage frame 68.

As the weight of the heat exchanger bundle shifts on the carriage frame 68, the hydraulic cylinders 66 may be adjusted to keep the heat exchanger bundle level or parallel with the ground and to keep the extractor apparatus 50 stable and prevent tipping of the extractor apparatus 50.

When the heat exchanger bundle is completely removed from the shell, the extractor apparatus 50 may be used to transport the heat exchanger bundle to a remote location for further inspection and maintenance work. The tracks 72 and 74 may be used to move the extractor apparatus 50 with the heat exchanger tube bundle carried on the carriage frame 68. This method of movement may be used to transport the heat exchanger bundle to the remote location, or in the alternative, the carriage frame 68 may be removed from the main frame 52 at the siamese cylinders 58 or alternatively at the hydraulic cylinders 66.

Cables or chains (not shown) may be attached the carriage frame 68 to provide a means for lifting the carriage frame 68 and the heat exchanger bundle from the main frame 52 and thereby leaving the tracks 72 and 74 on the ground along with the engine 78. Removing the carriage frame 68 from the main frame 52 provides a lighter weight system that may be aerially removed using a crane or helicopter. Furthermore, the carriage frame 68 and the heat exchanger bundle may be aerially removed and loaded on a flatbed truck or railcar for transportation offsite.

Alternatively, the carriage frame 68 may be removed from the mainframe 52 and aerially transported without the mainframe 52 and engine 78 to the work location before extracting the heat exchanger bundles. After the carriage frame 68 is transported to the work location and is at the proper height location at the shell, the sled 80 that is mounted to the carriage frame 68 may be used to attach the heat exchanger bundle to the carriage frame 68. The small motor 82 may move the sled 80 that, in turn, may pull the attached heat exchanger bundle onto the carriage frame 68.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for removing and installing a heat exchanger bundle, the apparatus comprising;
   a frame having a base frame and an upper frame, said upper frame being configured to disconnect from said base frame;
   a vertically shiftable portion associated with the base frame for vertically displacing portions of the upper frame relative to the base frame;
   a horizontally shiftable portion associated with the upper frame for horizontally displacing a portion of the upper frame;
   at least a pair of tracks supported by the base frame and adapted to advance the frame, the tracks being centered on, and in substantially parallel alignment with, the base frame; and
   a sled attached to the upper frame, said sled being configured to engage a heat exchanger bundle;
   wherein the longitudinal axis of the upper frame is in substantially parallel alignment with the longitudinal axis of the base frame when the upper frame is being vertically displaced relative to the base frame.

2. The apparatus of claim 1, further comprising a pulling member associated with the upper frame wherein the pulling member is configured to attach to the heat exchanger bundle.

3. The apparatus of claim 1, wherein the upper frame is configured such that it has a length capable of being substantially in alignment with a length of the heat exchanger bundle.

4. The apparatus of claim 1, further comprising a screw associated with the sled for moving the sled along the upper frame.

5. The apparatus of claim 1, wherein said vertically shiftable portion comprises a plurality of lifting members having feet wherein the plurality of lifting members vertically displace the upper frame relative to the base frame.

6. The apparatus of claim 1, wherein the lifting members are power cylinders.

7. A method for supporting a heavy load to be removed from an in-use location, the method comprising the steps of:
   providing an apparatus for removing the heavy load along a transport surface, said apparatus including a base frame and an upper frame having a plurality of portions;
   providing at least a pair of tracks on the apparatus for maneuvering the apparatus, the tracks being centered on, and in substantially parallel alignment with, the base frame;
   independently raising each of said plurality of portions of the upper frame relative to the base frame, wherein the upper frame is elevated to the height of the load;
   aligning the upper frame with the load;
   shifting the load from the in-use location onto the upper frame;
   lengthening the upper frame to accommodate the load; and
   stabilizing the apparatus as the load is shifted;
   wherein the upper frame is in substantially parallel alignment with the base frame of the apparatus.

8. The method of claim 7, further comprising the step of pulling the load onto the upper frame.

9. The method of claim 7, wherein a connection between the base frame and the upper frame is provided.

10. The method of claim 7, further comprising the step of detaching the upper frame from the base frame wherein the heat exchanger bundle and the upper frame can be lifted from the base frame.

11. The method of claim 7, wherein the load is one of a plurality of heat exchanger bundles positioned at various levels of elevation relative to a support surface adjacent to the in-use location.

12. A method for supporting and moving a heat exchanger bundle over a transport surface, the method comprising the steps of:
   providing a mobile extractor apparatus having a carriage frame and a main frame, said carriage frame being configured to disconnect from said main frame;
   moving the mobile extractor apparatus along a transport surface;
   raising the carriage frame relative to the main frame, wherein the carriage frame is elevated to the height of the heat exchanger bundle while the main frame remains adjacent the transport surface;
   pulling the heat exchanger bundle onto the carriage frame;
   lengthening the carriage frame to accommodate the heat exchanger bundle as the heat exchanger bundle is pulled onto the carriage frame;
   lowering the carriage frame and the heat exchanger bundle toward the transport surface;
   rotating at least a pair of tracks on the apparatus on the transport surface, the tracks being centered on, and in substantially parallel alignment with, the main frame of the apparatus, and
   advancing the apparatus along the transport surface, wherein the heat exchanger bundle and the carriage frame are in substantially parallel alignment with the main frame of the apparatus when the apparatus is advancing.

13. The method of claim 12, further comprising the step of actuating hydraulic cylinders on the apparatus to raise the carriage frame relative to the main frame.

14. An apparatus for removing and installing a heat exchanger bundle, the apparatus comprising;
   a frame having a base frame and an upper frame, said upper frame being configured to disconnect from said base frame;
   a vertically shiftable portion associated with the base frame for vertically displacing portions of the upper frame relative to the base frame;
   a horizontally shiftable portion associated with the upper frame;
   at least a pair of tracks supported by the frame, the tracks being centered on, and in substantially parallel alignment with, the base frame; and
   a sled supported by the upper frame, said sled being configured to engage a heat exchanger bundle;
   wherein the longitudinal axis of the upper frame is in substantially parallel alignment with the longitudinal axis of the base frame when the upper frame is being vertically displaced relative to the base frame.

15. The apparatus of claim 14, further comprising feet associated with the frame.

16. The apparatus of claim 14, further comprising a pulling member associated with the frame wherein the pulling member attaches to the heat exchanger bundles.

17. An apparatus for removing and installing a heat exchanger bundle, the apparatus comprising:
   a frame having a base frame and an upper frame, said upper frame having a first, second and third portion, said second portion being displaceable generally horizontally relative to said first portion, and said third portion being displaceable generally horizontally relative to said first and second portions;
   a vertically shiftable portion associated with the base frame for vertically displacing the upper frame relative to the base frame;
   at least a pair of tracks supported by the base frame and adapted to advance the frame, the tracks being centered on, and in substantially parallel alignment with, the base frame;
   a sled supported by said third portion of said upper frame and being displaceable generally horizontally relative to said third portion, said sled being configured to engage a heat exchanger bundle;
   wherein the upper frame is in substantially parallel alignment with the base frame when the upper frame is being vertically displaced relative to the base frame and the first, second and third portions of the upper frame are in substantially parallel alignment with the base frame when the second and third portions are being horizontally displaced.

* * * * *